Aug. 14, 1928. 1,680,790

J. JONAS

SYSTEM FOR REGULATING THE DIRECT CURRENT VOLTAGE
IN METAL VAPOR RECTIFIER INSTALLATIONS

Filed Oct. 8, 1920 2 Sheets-Sheet 1

Inventor
J. Jonas,
By H. R. Kerslake,
Attorney

Aug. 14, 1928. 1,680,790
J. JONAS
SYSTEM FOR REGULATING THE DIRECT CURRENT VOLTAGE
IN METAL VAPOR RECTIFIER INSTALLATIONS
Filed Oct. 8, 1920   2 Sheets-Sheet 2

Inventor
J. Jonas,
By H. R. Kerslake
Atty.

Patented Aug. 14, 1928.

1,680,790

UNITED STATES PATENT OFFICE.

JULIUS JONAS, OF MEIERHOF, BADEN, SWITZERLAND, ASSIGNOR TO AKTIENGESELL-SCHAFT BROWN, BOVERI & CIE., OF BADEN, SWITZERLAND.

SYSTEM FOR REGULATING THE DIRECT-CURRENT VOLTAGE IN METAL-VAPOR-RECTIFIER INSTALLATIONS.

Application filed October 8, 1920, Serial No. 415,672, and in Switzerland October 14, 1919.

In metal vapor rectifier installations the interlinking of the anode currents with one another by means of a transformer has been found to be advantageous, because this interlinking facilitates the parallel working of the light arcs and counteracts the extinguishing of single arcs. This interlinking is produced by means of a closed magnetic circuit upon which the anode currents exert an exciting action in such a manner that if the successive secondary phases of the transformer feeding the rectifier, be numbered consecutively, then the anode currents of the odd phases will magnetize the magnetic circuit in one direction, whereas the even phases will magnetize the said circuit in the opposite direction. In this connection it is immaterial per se whether separate exciting coils are provided for the currents of the several anodes, or whether the odd and even secondary phases are grouped together into systems each provided with a separate neutral point, so that therefore each of these two exciting coils are excited by the anode currents of a plurality of secondary phases.

This magnetic interlinking however necessitates for the rectifier a voltage drop which depends both on the amount of the self-induction of the interlinking coils and on the load current of the rectifier. If the magnetic system is highly saturated already with a small load current, then the voltage drop is essentially now only a function of the inductivity of the interlinking transformer. The manner in which the voltage drop entailed by the magnetic interlinking is produced, may be explained as follows:—

When a rectifier is fed from an interlinked six-phase system having only one neutral point, then each anode will carry periodically current only during the time of ⅙ period, the anode voltage varying from the value E sin 60° to E. The mean voltage value to which the resulting rectifier voltage approximately corresponds is therefore $$E \frac{1 + \sin 60°}{2} = 0.93 E = E_g.$$

If however the six-phase system is split up into two three-phase systems situated 180° apart, and then these latter systems are interlinked magnetically in the manner above described, then the time during which each anode carries current will be prolonged, so that the currents of the two groups of systems overlap each other as regards time. In the limit case the duration during which each anode carries current is increased to ⅓ period, the anode voltage varying from the value E sin 30 to E. The mean voltage value is now $$E \frac{1 + \sin 30}{2} = 0.75 E = E_g'.$$

The ratio $$\frac{E_g'}{E_g} \text{ is } = \frac{0.75}{0.93},$$

that is to say, about = 0.8. This consideration now leads to the idea of utilizing the interlinking transformer also for regulating the voltage of the rectifier installation if it is found possible to effect the variation of the inductivity in an economically and technically simple manner. In the present case the direct current voltage of the secondary net which is to be regulated, may be utilized for its own regulation, by regulating by means of its help the inductivity of the interlinking transformer.

The subject matter of the present invention is therefore a process for regulating the direct current voltage in metal vapour rectifier installations having anode currents that are interlinked with one another by means of a transformer, wherein the inductivity of an interlinking transformer for the anode currents, composed of two independent magnetic circuits, is regulated with the help of an excitation by a direct current voltage acting upon the said transformer.

Figure 5A:
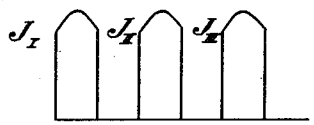
Figure 5B:
Figure 5C:
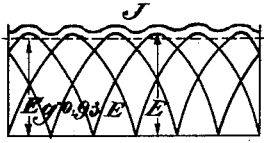

Figure 5$^b$ shows the duration of the flow of the anode currents of the secondary winding $S_2$, and therefore of the secondary phases I', II', III', if no interlinking exists with the currents of the secondary winding $S_1$.

Figure 5$^c$ shows the duration of the flow of the rectifier current resulting from the before-mentioned currents and of the rectifier voltage the value of which gives as a result 0.95 of the amplitude value of the alternating current voltage.

Figure 6A:
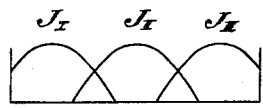
Figure 6B:
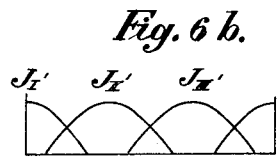
Figure 6C:

Figure 6$^b$ shows the duration of the flow of the anode currents of the secondary winding $S_1$, and therefore of the secondary phases I, II, III, if they are interlinked, according to the invention, with the currents of the secondary winding $S_2$.

Figure 6$^b$ shows the duration of the flow of the anode currents of the secondary winding $S_2$, and therefore of the secondary phases I', II', III', if they are interlinked, according to the invention, with the currents of the secondary winding $S_1$.

Figure 6$^c$ shows the duration of the flow of the rectifier current resulting from the before-mentioned currents (6$^a$ and 6$^b$) and of the rectifier voltage, the value of which gives as a result 0.75 of the amplitude value of the alternating current voltage.

Figure 4:
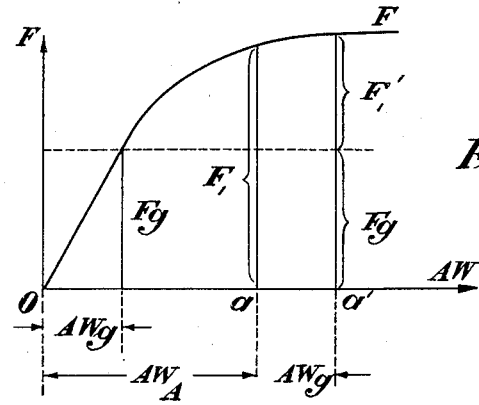
Figure 4 is a diagram representing the combined effect of the direct and alternating current fields in the interlinking transformer while Figure 5ª shows the duration of the flow of the anode currents of the secondary winding $S_1$, and therefore of the secondary phases I, II and III, if no interlinking with the currents of the secondary winding $S_2$ exists.

Figures 4 to 6$^c$ clearly illustrate the influence of the direct current saturation of the interlinking transformer upon the mode of the working of the rectifier.

In Figure 4, F is the field curve of the interlinking transformer; $AW_A$ are the exciting ampere turns of the anode current. For a given current and a given number of turns $Z_1$ (or $Z_1'$) of the transformer, let $AW_A = oa$, corresponding to the field $F_1$, and the E. M. F. induced in the interlinking transformer will be proportional to the expression $F_1 Z_1$.

If, now, the direct current field $F_g$ be generated in the transformer by means of a constant direct current excitation $AW_g$, then on the joining in of the ampere turns $AW_A$ the resulting field will only exceed the value $F_1$ by an inconsiderable amount owing to saturation; and the field $F_g+F_1'$ (corresponding to the value $AW_g+AW_A=oa'$) will be approximately equal to $F_1$; the E. M. F. induced in the transformer now corresponding only to the expression $F_1' Z_1$.

Since, now, the interlinking transformer is connected in series with the secondary winding of the main transformer and with the rectifier, the rectifier voltage will be equal to the difference between the secondary voltage of the main transformer and the voltage at the terminals of the interlinking transformer. Consequently, the direct current voltage of the rectifier can be regulated by a relatively small direct current excitation.

Figure 2:
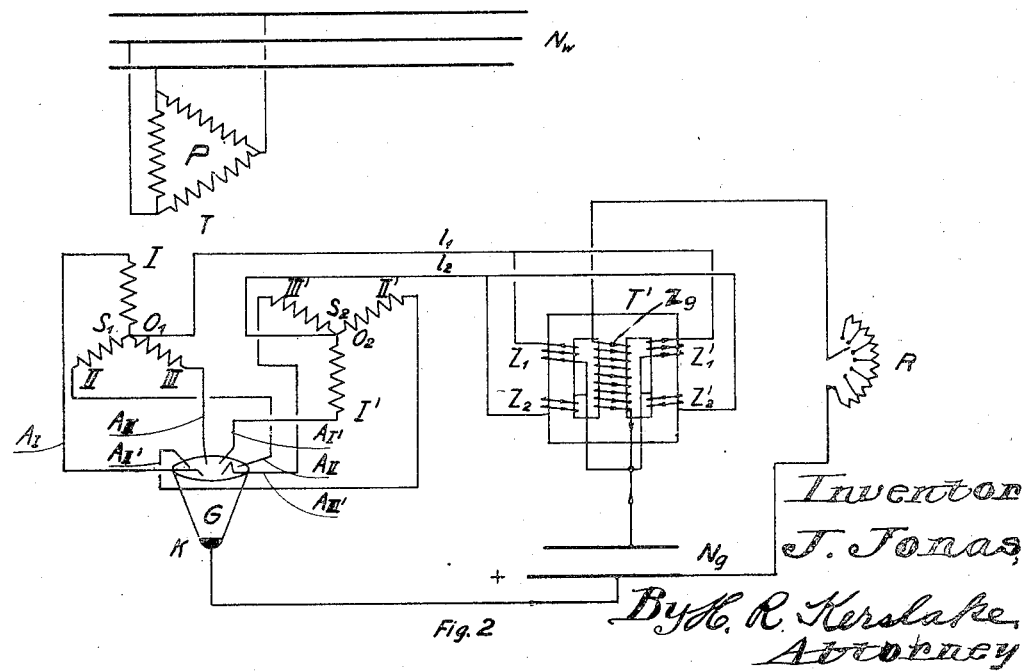
Figure 2 shows another method in which the secondary winding of the main transformer is divided into two phase groups each with its own zero point.

The influence of the direct current saturation of the interlinking transformer upon the distribution of the current and the voltage in the rectifier G of Figure 2 can be shown by reference to Figures 5$^a$ and 6$^c$.

If there were no interlinking transformer or if this transformer is rendered inoperative by direct current saturation, then each anode of the rectifier will carry current only during a time $=\frac{1}{6}$ frequency period. The duration of the flow of current of the anodes $A_I$, $A_{II}$, $A_{III}$ is represented in Figure 5$^a$, while the duration of the flow of current of anodes $A'_I$, $A'_{II}$, $A'_{III}$ is represented in Figure 5$^b$.

The current curve J of the rectifier is derived from the sum of the currents of the two groups of anodes as shown in Figure 5$^c$.

The same course as that of the curve of the rectifier current is shown by the curve of the rectifier voltage E whose mean value $E_g$ is calculated as being 0.93 E, as already stated.

If, now, the interlinking transformer be rendered operative, for instance by withdrawing the direct current excitation, then we get the course of the anode currents that is shown in Figures 6$^a$, 6$^b$, 6$^c$.

The anode currents have a sinusoidal course and overlap one another as regards time.

Figure 6$^a$ shows the anode currents of the group of anodes $A_I$, $A_{II}$, $A_{III}$.

Figure 6$^b$ shows the anode currents of the group of anodes $A'_I$, $A'_{II}$, $A'_{III}$.

Figure 6$^c$ represents the sum of these currents, giving a resulting current curve J of the rectifier that does not differ substantially from the current curve in Figure 5$^c$.

The stress on the anodes is, however, less than in Figure 5$^c$. The rectifier voltage shows likewise an analogous course to that in Figure 5$^c$, except that the mean value $E_g'$ is smaller, because the voltage drop caused by the transformer has to be deducted.

As already stated, the mean value is calculated to be $E_g = 0.75$ E, so that the regulation of the direct current voltage by regulating the direct current excitation of the transformer is equal to the ratio $$\frac{0.75}{0.93} = 0.8.$$

It amounts to about 20% of the maximum direct current voltage.

Figure 5$^a$ shows the duration of the flow of the anode currents of the secondary winding $S_1$, and therefore of the secondary phases I, II and III, if no interlinking with the currents of the secondary winding $S_2$ exists.

Figure 5$^b$ shows the duration of the flow of the anode currents of the secondary windings $S_2$, and therefore of the secondary phases I′, II′, III′, if no interlinking exists with the currents of the secondary winding $S_1$.

Figure 5$^c$ shows the duration of the flow of the rectifier current resulting from the before-mentioned currents and of the rectifier voltage, the value of which gives as a result 0.95 of the amplitude value of the alternating current voltage.

Figure 6$^a$ shows the duration of the flow of the anode currents of the secondary winding $S_1$, and therefore of the secondary phases I, II, III, if they are interlinked, according to the invention, with the currents of the secondary winding $S_2$.

Figure 6$^b$ shows the duration of the flow of the anode currents of the secondary winding $S_2$, and therefore of the secondary phases I′, II′, III′, if they are interlinked, according to the invention, with the currents of the secondary winding $S_1$.

Figure 6$^c$ shows the duration of the flow of the rectifier current resulting from the before-mentioned currents (6$^a$ and 6$^b$) and of the rectifier voltage, the value of which gives as a result 0.75 of the amplitude value of the alternating current voltage.

Figure 1:
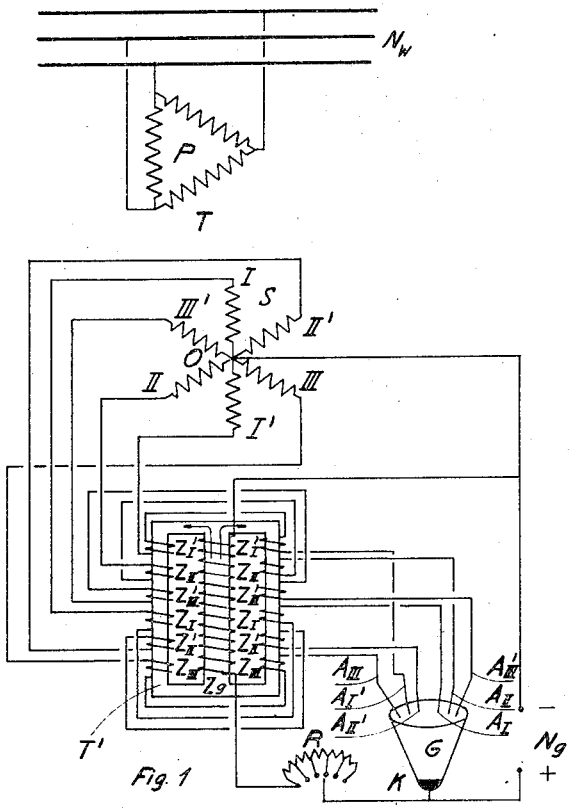
Figure 1 shows diagrammatically a scheme of connections for carrying the invention into effect.

As a constructional example a three-phase rectifier installation is illustrated in Fig. 1 where: T is a three-phase transformer whose primary winding P is connected to the three-phase net $N_w$, and whose secondary winding S is constructed with six phases. The secondary phases are marked I, II′, III, I′, II, III′; and I, II, III constitute one (odd) phase group; I′, II′, III′ constitute the other (even) phase group. Both groups are united at the zero point 0. T′ is the interlinking transformer constructed with three sides, wherein the two outer sides form with the middle side two independent magnetic circuits. Each of the two outer sides comprises six exciting coils $Z_I\ Z_{II}\ Z_{III}\ Z_{I'}\ Z_{II'}\ Z_{III'}$ which are traversed by the six anode currents, so that the coils $Z_I\ Z_{II}\ Z_{III}$ magnetize the two magnetic circuits in one direction, whereas the coils $Z_{I'}\ Z_{II'}\ Z_{III'}$ magnetize these in the other direction. The similarly designated coils of the two outer sides are respectively connected together in series, and have one end connected to the corresponding secondary phase, and their other ends connected to the corresponding anode of the rectifier G. The anodes $A_I$ to $A_{III}$ are each marked with an index which is the same as the designation of the respective secondary phase that feeds them. K is the cathode representing the positive pole of the direct current net $N_g$. On the middle core of the regulating transformer there is arranged the exciting coil $Z_g$ which is fed from the direct current net through the regulating resistance R.

If the direct current excitation $= o$, then the voltage generated at the coils by the anode current excitation is proportional to the product of the maximum field strength and the number of turns of the coils $Z_I$ $Z_{II}$ . . . . If however the coil $Z_g$ be excited by direct current, then the field variation under the influence of the anode currents is now only equal to the difference between the maximum attainable field strength entailed by the saturation and the direct current field. If this direct current field is itself near the practically attainable maximum value of the field, then under the influence of the anode currents, no further field variation takes place in the interlinking transformer, and the voltage at the excitation coils is practically equal to nil. Since this voltage however represents a voltage drop in the rectifier circuit, then consequently this drop and therefore the rectifier voltage itself will be regulated by the direct current excitation. The voltage drop is limited by the flattening of the current curve in the case of a good interlinking, and remains practically within the limits referred to at the beginning hereof. Whereas in this constructional example each of the two magnetic circuits is excited by as many single coils as there are secondary phases, the arrangement may also be made such that as a minimum only two coils traversed by anode currents act upon each magnetic circuit. For this purpose, the secondary winding of the transformer that feeds the rectifier, is divided according to Fig. 2, into two-phase groups, of which one group contains the odd secondary phases, whilst the other group contains the even secondary phases. Each group has its own zero point $0_1$ and $0_2$ from which the leads $1_1$ and $1_2$ pass that unite through the exciting coils $Z_1$ and $Z_1'$ and $Z_2$ and $Z_2'$ respectively, at the common neutral point 0. The coils $Z_1\ Z_1'$ $Z_2$ and $Z_2'$ no longer carry the anode current of a single secondary phase, but carry at a time-distance apart the anode currents of the phases of their group, so that the coils $Z_1$ and $Z_1'$ magnetize the magnetic circuits in one direction, whereas the coils $Z_2$ and $Z_2'$ magnetize these circuits in the opposite direction.

Figure 3:
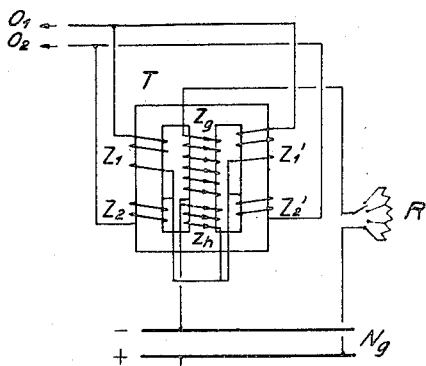
Figure 3 shows an additional series direct current winding on the middle limb of the interlinking transformer.

Also in this arrangement the interlinking transformer T′ has a third side on which is situated the direct current exciting coil $Z_g$. This coil is fed from the direct current nets $N_g$ through the regulating resistance R, and a regulation of this resistance entails a regulation of the voltage generated in the coils $Z_1\ Z_1'\ Z_2\ Z_2'$. Thus also, in the arrangement shown in Fig. 2, by regulating the direct current excitation, the inductive voltage drop in the anode circuit, and with it the direct current voltage of the rectifier installation is regulated. As already stated, it is an advantage to give the interlinking transformer such magnetic dimensions that a high value of saturation will be attained already at small values of the anode currents even without direct current excitation. Further, a compounding can be produced by providing on the third side, in addition to the direct current excitation $Z_s$ from the direct current voltage, also a direct current excitation from the main current $Z_n$ of the rectifier (Fig. 3).

What I claim is:—

1. In a rectifier system, a plurality of parallel rectifying paths, each path comprising a transformer winding and a serially connected rectifying element, common positive and negative terminals for said rectifier paths, said transformer windings constituting a polyphase alternating-current system supplying currents of different phases to said paths, means for interlinking the currents in said rectifying paths to cause overlapping of the currents rectified in the individual phases, and means for controlling the degree of interlinkage to vary the extent of the overlapping.

2. In a rectifier system, a plurality of star-connected rectifying paths and a polyphase alternating current source connected to said paths to constitute a plurality of rectifying phases corresponding to the phases of said source, transformer means for magnetically interlinking said rectifying phases to produce overlapping of the current flow in said phases by causing the current in one phase to induce current in another phase for simultaneously rectifying with more than one phase, and means for controlling the interlinking to vary said overlapping while continuing the rectification.

3. In a rectifier system, a polyphase alternating-current source, a plurality of rectifying elements having a set of terminals of one polarity connected to the terminals of said source and a common terminal of other polarity, a magnetic core for magnetically interlinking in transformer relationship the currents of different phase flowing from said source into said rectifier elements to cause overlapping of said currents, and means for controlling the magnetic reluctance of said core to vary said interlinking.

4. In a rectifier system, a polyphase transformer having a plurality of star-connected phase windings, a plurality of rectifying elements connected in star to the terminals of said winding, said windings constituting two phase groups symmetrically displaced with respect to each other, each phase group comprising alternate phases of said windings, means for magnetically interlinking the phases of one group with the phases of the other group to increase the time of current flow in the individual rectifying phases, and means for controlling the interlinking to vary the direct-current voltage of said rectifier system.

5. In a rectifier system, the combination with a plurality of star connected rectifying paths, an $m$-phase alternating current source having its phases, respectively, connected to the free terminals of said paths to constitute $m$ rectifying phases, a magnetic core for electromagnetically interlinking the currents in the individual rectifying phases to cause overlapping thereof through mutual transformer action, overlapping of said currents producing a decrease of the direct current voltage corresponding to rectification with a number of supply phase less than $m$, and means for controlling the saturation of said core to vary the interlinking between said currents.

6. In a rectifier system, a polyphase transformer having a plurality of star-connected phase windings, a plurality of star-connected rectifying elements, the three terminals of said windings and of said rectifying elements being connected into a plurality of rectifying phases, alternate phases being arranged into displaced phase groups, means for magnetically interlinking said phase groups by transformer action to cause each group to operate as a polyphase rectifier having a reduced number of phases, and means for controlling the interlinkage to vary the degree to which each group approximates operation as a polyphase rectifier of a reduced number of phases.

7. In a rectifier system, two sets of transformer phase windings, each set of windings constituting a polyphase system displaced with respect to the other system by half a phase angle, a plurality of star-connected rectifying paths connected to the end terminals of said windings to constitute two polyphase rectifying groups that are phase-displaced with respect to each other, and means for producing a variable transformer action of the currents in the phases of one group and on the currents in the phases of the other group to cause said two groups to approximate operation either as a polyphase system including the phases of both groups in which each phase carries current during a fraction of a cycle corresponding to the large phase number, or as two distinct polyphase groups in which each group carries current during a fraction of a cycle corresponding to the number of phases of each of said groups, respectively.

8. In a rectifier system, a polyphase transformer having a plurality of star-connected phase windings, a plurality of star-connected rectifying elements having the free terminals connected to the free terminals of said windings to constitute a plurality of phase displaced rectifying phases, alternate rectifying phases constituting two symmetrically displaced rectifying groups of half the number of phases of said transformer, and transformer means for effecting interlinkage of the phases of one group with the phases of the other group to cause the rectifying action of said groups to approximate either polyphase rectifier operation with the phases of both groups constituting a polyphase system in which each phase carries current during a fraction of the alternation corresponding to the number of phases in both groups or during a fraction of alternation corresponding to a polyphase system having the number of phases of one group only.

9. In a rectifier system, a plurality of star-connected rectifying paths, an $m$-phase alternating current source having its phases connected to the terminals of said rectifying paths, respectively, to constitute $m$ rectifying phases, alternate rectifying phases constituting $m/2$ phase group symmetrically displaced with respect to each other, interlinking transformer apparatus for interlinking the phases of said two groups to cause each group to operate as an $m/2$ phase rectifier system with one phase of each group carrying current simultaneously, said apparatus comprising two distinct closed magnetic core paths, each core path having two exciting windings connected to said groups respectively to oppositely excite said core by the rectifying currents of said groups, and a direct current exciting winding for said core paths, said direct current exciting winding producing excitation coinciding with the excitation of the rectified current of one group in one of said paths, and with the rectified current of the other of said groups in the other of said paths.

10. In a rectifier system, a plurality of star-connected rectifying paths, an $m$-phase alternating-current source having its phases connected to the terminals of said paths, respectively, to constitute $m$ rectifying phases, alternate rectifying phases constituting two symmetrically displaced phase groups having $m/2$ phases each, interlinking transformer apparatus comprising a magnetic core having two sets of windings connected in circuit with said groups respectively to oppositely excite said core for interlinking the currents in said groups and producing simultaneous rectification by one phase of each group, and means for controlling the flux condition in said core to vary the interlinking between the currents of said groups.

11. In a rectifier system, a plurality of star-connected rectifying paths, an $m$-phase alternating-current source having its phases connected to the terminals of said paths, respectively, to constitute $m$ rectifying phases, alternate rectifying phases constituting two symmetrically displaced $m/2$ phase groups, interlinking transformer apparatus comprising two distinct magnetic core paths, each path having two sets of windings connected respectively in circuit with the phases of said two groups to cause said core path to be oppositely excited by the currents in the two groups, and means for controlling the magnetic reluctance of said core path independently of the currents flowing in said phases to vary the mutual effect of said currents on each other.

12. In a rectifier system, $m$ star connected rectifying paths, $m$ being an even integer, an $m$-phase star connected transformer having its terminals connected to the free terminals of said rectifying paths to constitute $m$ rectifying phases, alternate rectifying phases constituting two symmetrically displaced $m/2$-phase groups, an interlinking transformer comprising a magnetic core having two core legs, and core portions joining the ends of said two core legs to constitute two distinct closed magnetic coil paths for each leg, respectively, each leg having two sets of windings oppositely connected in series with the rectifying phases of said two groups, respectively, to cause the rectifying currents of one group to produce a magnetizing action opposed to the magnetizing action of the rectifying currents of the other group, and direct-current exciting windings for inducing a uni-directional flux in the two coil legs, said uni-directional flux in one core leg coinciding with the flux produced by the rectifying current of one group, and in the other leg coinciding with the flux produced by the rectifying current of the other group.

13. In a rectifier system, two groups of star-connected polyphase transformer windings, the windings of one group being displaced with respect to the windings of the other group by half a phase angle, a plurality of star connected rectifying paths connected to the end terminals of said windings to constitute in conjunction therewith two polyphase rectifying groups that are phase displaced with respect to each other, an interlinking transformer comprising two core legs, core members joining the ends of said legs to constitute a closed magnetic path, and an additional bridging core member extending between said two core members, each core leg having two sets of windings connected in series relationship with the rectifying phases of said two groups, respectively, to oppositely magnetize said core leg, the windings on the two core legs traversed by the current of the same phase group exercising a comulative magnetizing action along the closed path including the two core legs, and means for producing a uni-directional flux extending in parallel through said core leg members and returning by way of said bridging core member.

14. In a rectifier system, an $m$-phase transformer having $m$ star-connected phase windings, a rectifier apparatus comprising $m$ anode terminals and a common cathode terminal, said anode terminals being connected to the free terminals of said windings, a direct-current line connected to the star point of said winding and to said cathode terminal, respectively, alternate phases of said transformer being arranged into two $m/2$-phase groups that are phase displaced by $360/m$ degrees, and interlinking transformer means for the rectifying phases of said two groups, said interlinking transformer comprising magnetic core members constituting two distinct closed magnetic circuits, two sets of windings around each of said magnetic circuits connected, respectively, in series with the phase windings of said two phase displaced groups to oppositely magnetize the associated circuit for effecting overlapping of the currents in the phases of one group with the phases of the other group, and exciting means for inducing a uni-directional flux in said two circuits superposed respectively on the fluxes induced by said two winding sets, said uni-directional flux in one magnetic circuit coinciding with the flux induced by the rectifying current of one phase group and the uni-directional flux in the other circuit coinciding with the flux induced by the rectifying current of the other phase group, and means for varying the magnitude of the uni-directional flux.

15. In a rectifier system, two sets of $n$-phase transformer windings groups, the windings of one group constituting a polyphase system displaced with respect to the other systems by $180/n$ degrees, said two groups constituting a $2n$ phase alternating-current system, a rectifier device having $2n$ anode terminals connected to said phase windings respectively, and a common cathode terminal, an interlinking transformer comprising two core members constituting two distinct closed magnetic circuits, two interlinking coils wound around the cores of each circuit, a negative direct-current terminal and a positive direct current terminal, the interlinking coils of each core circuit being so connected between said negative terminal and the star points of each winding group that the rectifying current flowing from one winding group magnetizes oppositely to that of the other winding group, and direct-current windings for superposing uni-directional magnetization on said circuits, the uni-directional magnetization of one of said circuits coinciding in direction with the magnetization produced by the interlinking coils of one group and in the other circuit coinciding with the magnetization produced by the interlinking winding of the other group, and means for varying said direct current magnetization in response to the variation of the direct-current voltage.

16. In a rectifier system, two sets of $n$-phase windings groups, the windings of one group constituting a polyphase system displaced with respect to the other systems by $180/n$ degrees, said two groups constituting a $2n$ phase alternating-current system, a rectifier device having $2n$ anode terminals connected to said phase windings respectively, and a common cathode terminal, an interlinking transformer comprising two core members constituting two distinct closed magnetic circuits, two interlinking coils wound around the cores of each circuit, a negative direct-current terminal and a positive direct current terminal, the interlinking coils of each core circuit being so connected between said negative terminal and the star points of each winding group that the rectifying current flowing from one winding group magnetizes oppositely to that of the other winding group, and direct-current windings for superposing uni-directional magnetization on said circuits, the uni-directional magnetization of one of said circuits coinciding in direction with the magnetization produced by the interlinking coils of one group and in the other circuit coinciding with the magnetization produced by the interlinking winding of the other group, and means utilizing the direct current derived from said rectifier device to supply said direct current windings.

17. In a rectifier system, an $m$-phase transformer having $m$ star-connected phase windings, a rectifier apparatus comprising $m$ anode terminals and a common cathode terminal, said anode terminals being connected to the free terminals of said windings, a direct-current line connected to the star point of said winding and to said cathode terminal, respectively, alternate phases of said transformer being arranged into two $m/2$-phase groups that are phase displaced by $360/m$ degrees, and interlinking transformer means for the rectifying phases of said two groups, said interlinking transformer comprising magnetic core members constituting two distinct closed magnetic circuits, two sets of windings around each of said magnetic circuits connected, respectively, in series with the phase windings of said two phase displaced groups to oppositely magnetize the associated circuit for effecting overlapping of the currents in the phases of one group with the phases of the other group, and exciting means for inducing a uni-directional flux in said two circuits superposed respectively on the fluxes induced by said two winding sets, said uni-directional flux in one magnetic circuit coinciding with the flux induced by the rectifying current of one winding group, said uni-directional flux in the other magnetic circuit coinciding with the flux induced by the rectifying current of the other group, said exciting means comprising direct-current windings traversed by the rectified direct current supplied by said rectifier.

18. In a rectifier system, two groups of star-connected transformer windings, the windings of one group being displaced with respect to the windings of the other group by half a phase angle, a plurality of star connected rectifying paths connected to the end terminals of said windings to constitute in conjunction therewith two polyphase rectifying groups that are phase displaced with respect to each other, an interlinking transformer comprising two core legs, core members joining the ends of said legs to constitute a closed magnetic path, and an additional bridging core member extending between said two core members, each core leg having two sets of windings connected in series relationship with the rectifying phases of said two groups, respectively, to oppositely magnetize said core leg, the windings on the two core legs traversed by the current of the same phase group exercising a cumulative magnetizing action along the closed path including the two core legs, and means for producing a unidirectional flux extending in parallel through said core leg members and returning by way of said bridging core member, said interlinking transformer being so dimensioned that a high degree of saturation is obtained at relatively low rectified currents.

In testimony whereof I have signed my name to this specification.

JULIUS JONAS.